United States Patent [19]

Kromrey

[11] Patent Number: 4,590,860
[45] Date of Patent: May 27, 1986

[54] CONSTANT PRESSURE END BURNING GAS GENERATOR

[75] Inventor: Robert V. Kromrey, Campbell, Calif.

[73] Assignee: United Technologies Corporation, Hartford, Conn.

[21] Appl. No.: 569,817

[22] Filed: Jan. 11, 1984

Related U.S. Application Data

[63] Continuation of Ser. No. 286,924, Jul. 27, 1981, abandoned.

[51] Int. Cl.$^4$ ................................................. C06D 5/06
[52] U.S. Cl. .................................... 102/289; 102/290; 102/291; 102/292; 102/349
[58] Field of Search ............... 102/284, 285, 288, 289, 102/290, 291, 292, 349

[56] References Cited

U.S. PATENT DOCUMENTS

| | | | |
|---|---|---|---|
| 1,920,075 | 7/1933 | Haenichen | 102/290 X |
| 3,324,795 | 6/1967 | Miles et al. | 102/290 X |
| 3,407,595 | 10/1968 | Peterson | 102/291 X |
| 3,529,551 | 9/1970 | Barbero et al. | 102/287 |
| 3,706,278 | 12/1972 | Stiefel et al. | 102/288 X |
| 3,931,765 | 1/1976 | Portalier | 102/291 |
| 3,933,098 | 1/1976 | Portalier | 102/291 |
| 3,951,072 | 4/1976 | Baker | 102/291 |
| 3,958,417 | 5/1976 | Gordon et al. | 102/290 X |
| 3,965,676 | 6/1976 | Schaffling | 102/290 X |
| 3,967,558 | 7/1976 | Brody et al. | 102/285 |
| 4,013,743 | 3/1977 | Blasche et al. | 102/284 X |
| 4,314,509 | 2/1982 | Dalet | 102/288 |
| 4,337,218 | 6/1982 | Byrd et al. | 102/289 X |

FOREIGN PATENT DOCUMENTS 2260769  9/1975  France ................................ 102/291

Primary Examiner—Peter A. Nelson
Attorney, Agent, or Firm—Steven F. Stone; C. G. Nessler

[57] ABSTRACT

End burning gas generators for use either as propulsion systems or means for generating large volume of gases for various purposes such as the generation of the fuel for a ducted rocket engine, the rapid inflation of air bags for personal protection or recovery of submersed items or the expulsion of projectiles from subsurface launch tubes are currently widely utilized. End burning gas generator grains are ignited at one end of a generally cylindrical charge mounted within a combustion chamber which is fixed with a suitable exhaust means. For many of the applications described above, it is desirable that the gas generator burn in a uniform manner such that a constant volume of gas is generated per unit of time so that the chamber pressure and the mass flow rate of gas remain constant. It has been observed, however, that rather than regressing at a uniform rate, the propellant grain burns in a manner which produces a convex cone, the angle of which increases with time thereby causing the burning surface to increase with time and to result in a progressive pressure trace within the combustion chamber and a corresponding continually increasing mass flow rate through the nozzle. According to this invention, it has been found that an end burning propellant grain can be caused to produce a substantially uniform pressure trace throughout its burn time if the interface between the grain and its container has a length greater than the axial length of the grain. The relationship between the length of the interface and the length of the grain is selected to compensate for the increased burning rate which is observed to occur at the interface and which produces the coning effect. The increased interfacial length can be easily obtained by the use of the corrugated member between the propellant grain and the case, the length across the corrugations providing the increase over the axial length of the grain. For typical gas generator propellant compositions, it has been found that if the interface is between 1.4 and 1.6 times the axial length of the grain that a substantially uniform pressure trace can be obtained. The corrugated interface also acts to improve the bond strength between the grain and the case.

7 Claims, 5 Drawing Figures

U.S. Patent  May 27, 1986  Sheet 1 of 2  4,590,860
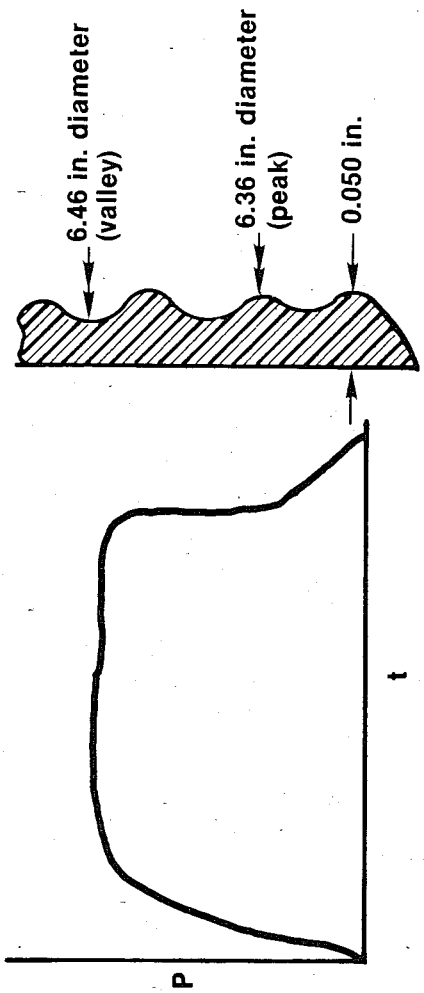
FIG. 1
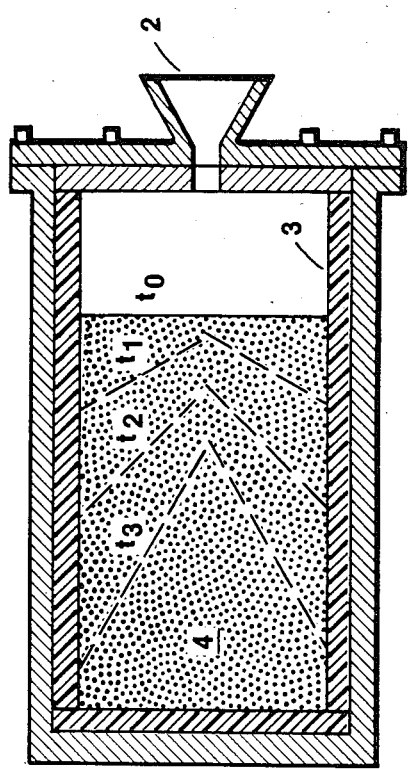
FIG. 2
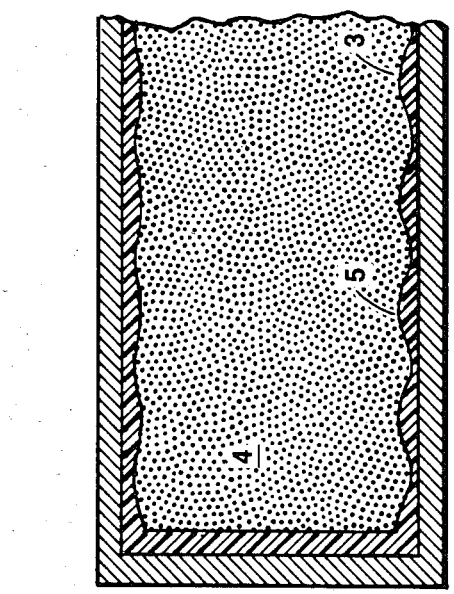
FIG. 6
FIG. 4
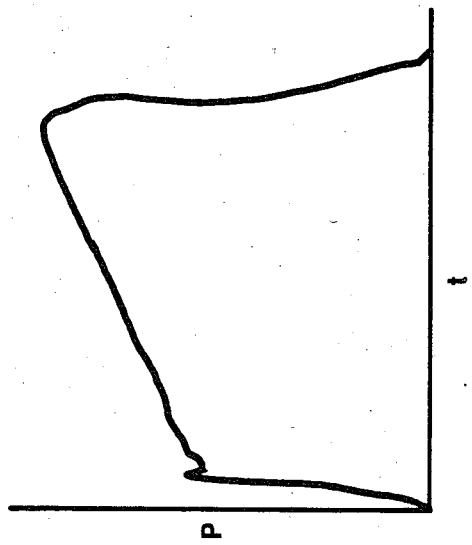
FIG. 3

CONSTANT PRESSURE END BURNING GAS GENERATOR

This is a continuation of application Ser. No. 286,924, filed on July 27, 1981, now abandoned.

BACKGROUND OF THE INVENTION

Solid propellant and gas generator charges or grains are currently used in many applications ranging from propulsion devices, such as rocket motors, to gas generators for inflation of gas bags or expulsion of rocket motors from launch tubes or for the generation of a fuel rich gas stream to be burned by a ducted rocket motor, for example. As used herein the term, "gas generator grain," will apply to any solid composition that is capable of self-sustained combustion to produce a gas stream regardless of whether that gas stream is subsequently used for propulsion, expulsion, or gas generating purposes.

Gas generating grains generally are classified as either end burning or internal burning. An end burning grain is one which is mounted within a combustion chamber provided with a suitable exhaust, ignited at one end; the burning surface then progressing to the other end at which point the entire grain is consumed. An internal burning grain is one which is provided with one or more ports along the length of the grain which, when ignited, burns either solely at these internal surfaces or, in some cases, a combination of the end surface and the internal surface. Internal burning grains have a greater degree of design flexibility since the rate at which the combustion gases are generated can be predictably determined by the design of the number and configuration of the ports. End burning grains, however, do not have such design flexibility, although they have the advantage of maximizing the amount of propellant that can be contained in any particular volume since there are no empty spaces for the ports.

A typical end burning gas generator grain exhibits what is known as a progressive pressure trace. This occurs because the gas evolution rate increases with burn time causing the pressure generated within the combustion chamber to increase with time. This characteristic is undesirable for many gas generator applications in which it is desired to have a relatively constant gas generation rate throughout a substantial portion of the burn time of the propellant grain.

According to this invention, I can control the gas generation rate of an end burning gas generator grain to produce a substantially constant gas generation rate. By applying a similar technique, I am also capable of selectively varying the gas generation rate through the burn time of the end burning gas generator grain. In addition, the technique by which the gas generation rate may be adjusted also permits the attainment of an improved bond between the gas generator and the liner or insulation which is interposed between the grain and the combustion chamber case.

It is accordingly an object of this invention to provide a method for controlling the rate of evolution of the gases produced by an end burning gas generator grain.

It is another object of this invention to provide an end burning gas generator having a substantially constant gas generation rate over a substantial portion of its burn time.

It is another object of this invention to provide a gas generator grain in which the rate of gas evolution is selectively varied during its burn time.

It is another object of this invention to provide a gas generator grain having improved bonding between the gas generator grain and the liner of the combustion chamber.

It is another object of this invention to provide a method for fabricating an end burning gas generator assembly.

These and other objects of the invention will be readily apparent from the following description of the invention with reference to the accompanying drawings wherein:

FIG. 1 is a sectional view of the conventional end burning gas generator assembly.

FIG. 2 is a pressure vs. time trace for the unit of FIG. 1.

FIG. 3 is a sectional view of the gas generator of my invention

FIG. 4 is a pressure trace obtained from the embodiment of FIG. 3.

FIG. 6 is a detailed view of a corrugated liner according to my invention.

DESCRIPTION OF THE INVENTION

Figure 5:
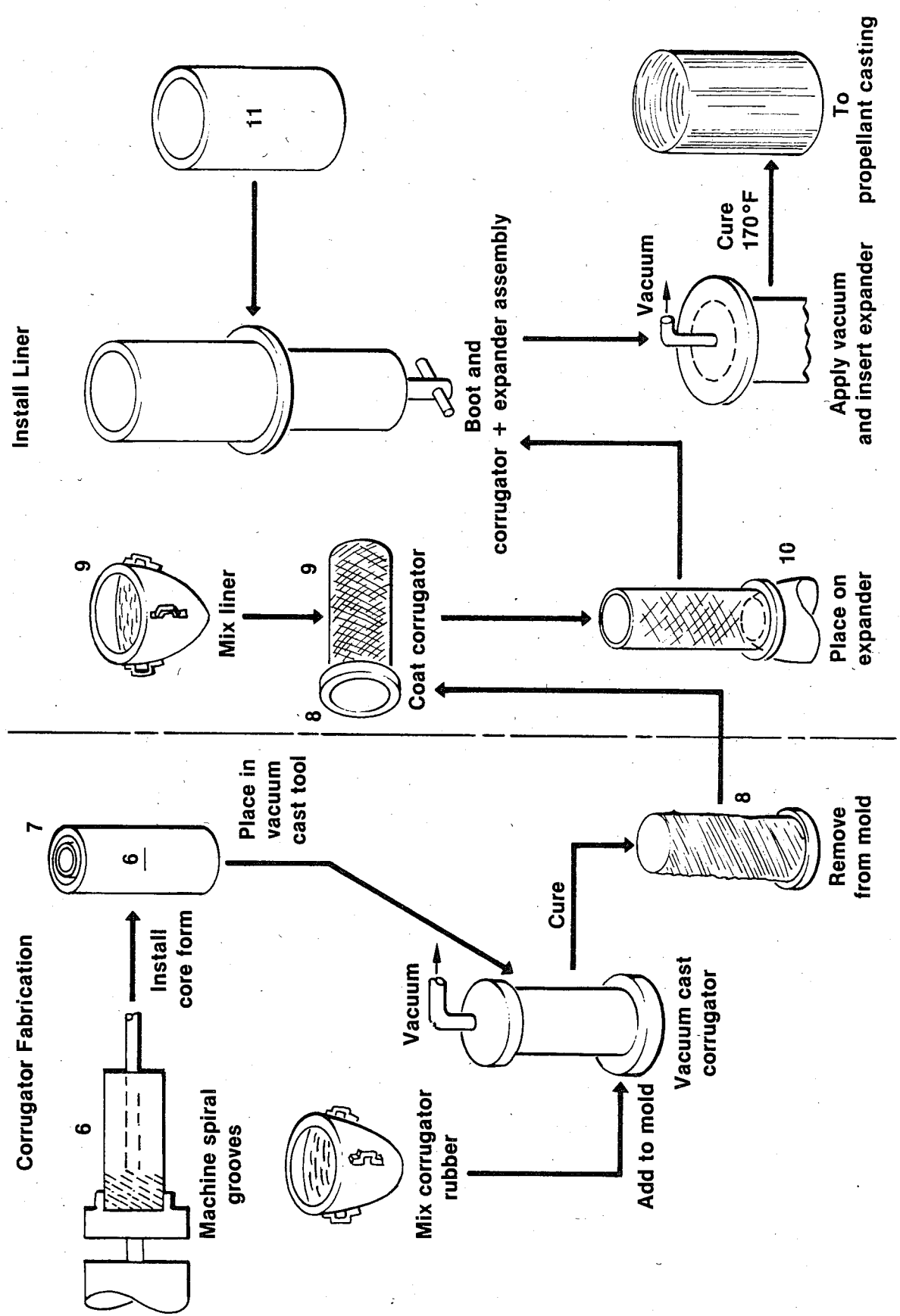
FIG. 5 is a flow diagram of liner processing according to this invention.

A typical gas generator assembly is shown in FIG. 1, consisting of a combustion chamber 1 provided with outlet or exhaust means 2 having suitable insulation 3 applied along the internal surfaces of the combustion chamber and containing a gas generator grain 4 which, in this embodiment, is a cylindrical grain mounted in the forward end of the combustion chamber. The insulation is sometimes referred to as a liner or a boot and the terms are used interchangably herein.

After ignition by conventional igniter means (not shown), I have determined that the progressive burning characteristics of such a device results from an effect known as "coning" of the gas generator burning surface. Thus as shown in FIG. 1, while the initial surface of the grain at "$t_0$" is basically flat, as the burn progresses, a cone of ever-increasing acuteness is formed. Thus as shown at "$t_1$" a slight coning of the burning surface is noted and this coning becomes increasingly accentuated at "$t_2$" and "$t_3$" as shown in FIG. 1. The effect of this coning is that the burning surface area increases until shortly before the propellant grain is totally consumed, thereby increasing the rate at which gas is evolved throughout the burn until just before the propellant grain is totally consumed. A typical pressure versus time trace of such a grain is shown in FIG. 2, and this pattern is characterized as a "progressive" pressure versus time trace. Coning occurs because the axial burning rate along the external surface of the grain is greater than at the center of the grain. This produces the gradually increasingly acute coning of the burning surface that I have observed.

The exact mechanism which produces the increased burning rate is not known. Without being limited thereto however it is my belief that it results from some unusual conditon of combustion created at the interface between the burning grain and the non-burning surface adjacent thereto. Regardless of the mechanism, this phenomenon occurs to a greater or lesser degree in all end burning gas generator grains and formulations that I have observed, and hereinafter the "interfacial burning rate" will be used to describe the axial burning rate along the external surface of the grain. The term "non interfacial" burning rate will mean the axial burning rate at the center of the grain. In these formulations, it has been noted that the burning rate at the interface is in a range of 1.4 to 1.6 times the burning rate at the center of the grain. It should be noted, however, that the actual variation in burning rate for any particular gas generator grain can be readily determined by observation, and this invention is not to be construed as being limited to the specific burning rate variations that I have, so far, experimentally observed.

According to my invention, I have found that I can compensate for the increased interfacial burning rate if means are provided to increase the axial length of the external surface of the gas generator grain so that the interfacial length is greater than the length of the gas generator grain in the same ratio as the interfacial burning rate is greater than the noninterfacial burning rate determined to be. Thus, for example, if the interfacial burning rate is 1.6 times the burning rate at the center of the gas generator grain, then the axial length of the external surface of the gas generator grain should be approximately 1.6 times greater than the axial length of the propellant grain. Thusly, employment of the invention for constant propellant burn rate includes: determination of the interfacial and non-interfacial burn rates of the gas generator grain composition, and determination of the internal surface length to axial length ratio at which constant propellant burn occurs. Various means for increasing the axial length of the external surface and therefore the interfacial length beyond the axial length of the grain itself can be used; however, the simplest and therefore preferred embodiment of this invention is to corrugate the surface of the liner such that the total length across the hills and valleys of the corrugations is greater, in the proper proportion, than the axial length of the grain and thereafter cast the grain into the corrugated liner.

Referring now to FIG. 3, a preferred embodiment of my invention is shown. In this embodiment, the liner 3 has been provided with a corrugated internal surface 5 and the gas generator grain 4 cast therein. When the length of the corrugations is greater than the axial length by the same ratio that the interfacial burning rate is greater than the noninterfacial burning rate, a pressure trace such as shown in FIG. 4 is obtained.

Although a primary object of this invention is that a substantially constant gas generation rate be obtained in an end burning gas generator throughout most of its burn time; my invention can also be used to produce predetermined variations in the gas generator rate should that be desired. Thus rather than having the means for increasing the interfacial rate constant along the length of the grain, the length could vary at various axial locations. Thus by increasing or decreasing the interfacial length (such as by varying the configuration of the corrugations) at any particular section along the gas generator grain, a particular effect resulting from the localized variation in the burning rates can be obtained. Various means can be used to increase the interfacial length versus the axial length. These include knurling and ridging, among others, of the interface. Corrugating the exterior surface of the grain by casting into an internally corrogated liner presents many manufacturing and engineering advantages and is preferred.

Various techniques may be used to fabricate an internally corrugated insulator 3 according to my invention. If the material from which insulator 3 is made is susceptible of relatively precise machining, the corrugations can be machined directly into the surface of the liner 3. In most cases, however, the liner 3 is a rubbery material which is not readily susceptible to precise machining. Thus it is preferable that the corrugations be molded or cast into the surface of the insulator. This is simply accomplished by first fabricating a "corrugator" and then using the corrugator to form the insulator as is shown in the flow diagram of FIG. 5. First, a spiral groove having the desired configuration is machined into the internal surface of a metal tube 6 which is then used as a mold to vacuum cast the corrugator 8. A central mandrel 7 is placed within tube 6 to provide an annulus of the design thickness of the corrugator. The corrugator rubber, preferably a silicone rubber, is poured into the mold and vacuum cast and cured. The finished corrugator 8 is then removed from the mold. This corrugator 8 is then used to form the corrugations on the internal surface of the insulator. If the corrugations and insulator are to be formed from the same material, the corrugator can be lubricated internally, placed on a lubricated expander 10 which is adapted to be forced into the center of the corrugator to expand it to the desired dimension such that the corrugations on the corrugator are forced into the internal surface of an insulator sleeve 11 received within a suitable mold 12, the sleeve 11 is formed of a "B" stage material such as EPDM (ethylene propylene dien monomer, a neoprene rubber) and the assembly heated to approximately 300° F. to cure, the corrugations will be formed directly into the internal surface of the sleeve 11. Upon withdrawal of the expander 10, the corrugator 8 will shrink away from the sleeve 11 and permit ready removal.

If the insulator sleeve 11 is to be formed from a material different than the corrugations itself as may be the case where sleeve 11 is selected primarily for its insulating capability, then it becomes necessary to modify the previously described process slightly by coating the exterior of the corrugator 8 with a liquid rubber 9 that will bond to sleeve 11 to form the corrugations on the internal surface of the sleeve. The coated corrugator is then placed into a mold 12, containing sleeve 11 and cured as described above. Various materials may be used to form the corrugators, the insulator liner or boot, and the corrugations themselves. I have found that the Dow Corning Silicone Rubber RTV-E is particularly useful in the preparation of the corrugator since it has very desirable release properties. When the insulator liner boot 11 is formed from a material different than the corrugations themselves, useful polymeric materials for the corrugations are carboxy terminated and hydroxy terminated polybutediene polymers which can be cast directly onto the boots. Insulator materials themselves can be selected from a wide variety of materials, particularly preferable are D.C. 98-104 silicone rubber.

A gas generator composition having the formulation of Table 1 was found to have an interfacial burning rate of approximately 1.4 times the noninterfacial burning rate by observation of fired grains.

| | |
|---|---|
| Ammonium Perchlorate | 1.7 micron/32% |
| RDX | 3 micron/6% |
| Carbon | 25 meter sq. per gram/6% |
| Polyalphamethylstyrene | 400-600 micron/24% |
| $FE_2O_3$ | 2% |
| Ferrocene | 2% |
| Hydroxy terminated/Polybutadiene | 28% |

-continued cured with IPDI

FIG. 6 shows the configuration of the corrugated liner necessary to produce the increase in length required to compensate for the increased burning rate.

While this invention has been described with respect to certain specific embodiments thereof, it should not be construed as being limited thereto. Various changes and modifications will be apparent to workers skilled in the art, which can be made without departing from the scope of this invention which is limited only by the following claims wherein:

I claim:

1. A gas generator comprising a combustion chamber having gas outlet means and an end burning gas generator grain contained therein, said gas generator grain filling the cross section of a portion of the combustor and the grain in said portion being characterized by the length of its external surface being greater than its axial length in an amount sufficient to produce in the grain a substantially constant gas generating burn rate when ignited.

2. The gas generator of claim 1 wherein the external surface of said gas generator grain is provided with a plurality of axially spaced corrugations which increase the length of the external surface over the axial length.

3. The gas generator of claim 2 wherein said corrugations are in the form of a helical groove extending continuously around the external surface of said gas generator grain.

4. The gas generator of claim 3 wherein said gas generator grain is received within a thermal insulation member disposed between said grain and the wall of said combustion chamber whereby the bond strength between said insulation and said grain is enhanced.

5. A method for producing an end burning gas generator grain capable of producing a constant chamber pressure over a substantial portion of its burn time comprising:
  (a) determining the interfacial and non-interfacial burning rate of a gas generator composition; and
  (b) forming an end burning gas generator grain from said composition said grain having an external surface with a length greater than the axial length of said grain in the same proportion as the interfacial burning rate is greater than the non-interfacial burning rate of said propellant composition.

6. The gas generator of claim 1 or 2 wherein said gas generator grain is received within a thermal insulation member disposed between said grain and the wall of said combustion chamber whereby the bond strength between said insulation and said grain is enhanced.

7. A method of controlling the rate of propellant burn in an end burning gas generator, comprising the steps of:
  (a) determining the desired rate of propellant burn,
  (b) determining the interfacial and noninterfacial burning rate of the gas generator grain compositions,
  (c) determining the external surface length to axial length ratio in consideration of the difference between interfacial and noninterfacial burning ratio at which the rate or propellant burn is constant,
  (d) forming an end burning gas generator grain having a decreased external surface length to axial length ratio relative to the ratio at constant propellant burn at grain regions where an increased rate of propellant burn is desired.

* * * * *